(12) United States Patent
Luo et al.

(10) Patent No.: US 7,555,160 B2
(45) Date of Patent: Jun. 30, 2009

(54) COMPENSATING FOR HUMAN PERCEPTION OF COLOUR

(75) Inventors: Ming Ronnier Luo, Harrogate (GB); Kaida Xiao, Beijing (CN); Changjun Li, Derby (GB)

(73) Assignee: Imperial Chemical Industries PLC, London (GB)

( * ) Notice: Subject to any disclaimer, the term of this patent is extended or adjusted under 35 U.S.C. 154(b) by 666 days.

(21) Appl. No.: 11/261,034

(22) Filed: Oct. 28, 2005

(65) Prior Publication Data

US 2006/0164663 A1 Jul. 27, 2006

Related U.S. Application Data

(63) Continuation of application No. PCT/EP2004/004676, filed on Apr. 29, 2004.

(51) Int. Cl.
G06K 9/00 (2006.01)
(52) U.S. Cl. .................................. 382/162; 358/1.9
(58) Field of Classification Search ................ 382/162, 382/167; 358/1.9, 2.1
See application file for complete search history.

(56) References Cited

U.S. PATENT DOCUMENTS

| | | | | |
|---|---|---|---|---|
| 6,023,525 | A * | 2/2000 | Cass | 382/162 |
| 6,954,549 | B2 * | 10/2005 | Kraft | 382/167 |
| 7,139,098 | B2 * | 11/2006 | Klassen | 358/1.9 |
| 7,312,899 | B2 * | 12/2007 | Nichogi | 358/2.1 |
| 7,327,372 | B2 * | 2/2008 | Tsukada | 345/589 |
| 7,388,656 | B2 * | 6/2008 | Liu | 356/30 |
| 2003/0112454 | A1 * | 6/2003 | Woolfe et al. | 358/1.9 |
| 2007/0153256 | A1 * | 7/2007 | Liu | 356/30 |
| 2008/0124575 | A1 * | 5/2008 | Hollman et al. | 428/702 |
| 2008/0299521 | A1 * | 12/2008 | Taylor et al. | 434/98 |

FOREIGN PATENT DOCUMENTS

WO  WO 2008001290 A1 * 1/2008

OTHER PUBLICATIONS

F. H. Imai et al., "Perceptual color difference metric for complex images based on Mahalanobis distance"Journal of Electronic Imaging 10(2), 385-393 (Apr. 2001), pp. 1-9.*
James C. Ragain et al., "Color Acceptance of Direct Dental Restorative Materials by Human Observers", Dental Research, Jun. 1998, Nice, France.2000 John Wiley & Sons, Inc, pp. 278-285.*

(Continued)

*Primary Examiner*—Samir A. Ahmed
*Assistant Examiner*—Mekonen Bekele
(74) *Attorney, Agent, or Firm*—George W. Moxon, II; Roetzel & Andress

(57) ABSTRACT

A method, combination or apparatus for compensating for or predicting the shift in the human perception of color which occurs when the color is seen on a small surface area as compared with when it is seen extending over of large surface area. The compensation or prediction is performed by increasing (compensation) or decreasing (prediction) the lightness and chroma of the color in a specified way. The invention allows choosers of color to take account of the shifts when making their choice of colors and is useful in choosing colors for paints, plastics, textiles or illuminated surfaces.

14 Claims, 12 Drawing Sheets

OTHER PUBLICATIONS

Li-Chen Ou et al., "A Study of Colour Harmony for Two-colour Combinations", Colour & Imaging Institute, University of Derby, Kingsway House, Kingsway, Derby, DE22 3HL,pp. 1-7.*

K. Xiao, M.R. Luo, C.J. Li, P.A., Rhodes and C. Taylor:, "Specifying the Colour Appearance of a Real Room", Eleventh Color Imaging Conference, Color Science and Engineering Systems, Technologies, applications, Nov. 3, 2003, pp. 308-312, XP002293731 Scottsdale, Arizona whole document.

Billger M: "Evaluation of a colour reference box as an aid for identification of colour appearance in rooms", Color Research & application, Jun. 2000, Wiley, USA, vol. 25, No. 3, Jun. 2000, pp. 215-225, XP008020106 ISSN: 0361-2317, cited in the application, whole document.

Luo M.R. et al: "Quantifying Colour appearance Part I. Lutchi Colour Appearance Data", Color Research and Application, John Wiley & Sons Inc. New York, US, vol. 16, No. 6, Jun. 1, 1991, pp. 166-180, XP000622014, ISSN: 0361-2317, the whole document.

* cited by examiner

Colours used

Colours used

COMPENSATING FOR HUMAN PERCEPTION OF COLOUR

This application is a continuation filing of PCT International Application No. PCT/EP/2004/004676 filed Apr. 29, 2004 entitled "A METHOD FOR COMPENSATING FOR SHIFTS IN HUMAN PERCEPTION OF COLOUR" and now published with the International Publication No. WO 2004/097353. This application also claims the right of priority under 35 U.S.C. §119(a) to Great Britain Patent Applications No. 0309775.5 filed Apr. 30, 2003 and 0326207.8 filed Nov. 11, 2003. The disclosure of all of these applications is hereby incorporated in their entirety by reference.

This invention relates to a method for compensating for shifts in human perception of colour which occur when a colour initially perceived as a small colour sample (ie. a sample of only a small area, say 80 mm by 80 mm or smaller) is then perceived extending over a large surface area (say an area of 4 m by 3 m or larger) such as the surface of the wall or ceiling of a room or a large expanse of ceramics, plastics or textile material. Perhaps somewhat arbitrarily, when the human mind perceives a small area of a coloured surface such as a small colour sample, it regards the perceived colour as being the "true" colour of the surface and such a human perception corresponds quite closely with the colour of the surface as determined by scientific instruments. Scientific instruments will record the true colour of a surface irrespective of whether the surface extends over a small area or a large area but when a coloured surface extends over a large area, the human mind will perceive its colour as being a different colour. This different colour will be called a "shifted colour".

The shift in human perception occurs even when an investigation of the coloured surfaces using scientific instruments shows that both the small and large surfaces are composed of the very same material. In other words, it is the human perception of the colour which has changed and not the coloured material. This shift in human perception leads people to be dissatisfied with their choices of colour for large areas (eg. walls, ceilings or curtains) if the choice was originally made using small colour samples (eg. those found in paint sales brochures, drapers catalogues or other collections of colour samples) because the shift will be unexpected by all but the most experienced choosers of colour.

Professional choosers of colour (such as architects, interior decorators, textile designers and vehicle stylists) are often called "professional colour specifiers". In contrast, ordinary members of the public choosing colours will be called "unskilled choosers".

This invention also relates to a method for predicting the above described shifts in the human perception of colour. The invention further relates to apparatus for facilitating the performance of the above methods.

Another aspect of the invention relates to a method for illustrating how the colour of a small colour sample will be perceived by the human mind when the colour extends over a large surface area and also a combination of the carrier and one or more imparted second colours for use in this method of illustrating the shift in colour.

Unskilled choosers will frequently choose colours from sales brochures containing collections of up to about 100 small colour samples whilst professional colour specifiers will often choose from commercial collections of colour samples containing from around 700 to over 6000 small colour samples. The colours of the colour samples in such collections are identified by a name, code or cypher which relates to the true colour of the sample and not to any shifted colour.

Accurate and consistent reproduction of colour samples by printing requires the use of sophisticated inks which are expensive and so both ink costs and the large numbers of samples traditionally offered dictate that most printed colour samples will be small. Therefore, whilst commercial colour samples as large as A4 size are available, the majority of colour samples extend over small areas of from 100 to 3000 $mm^2$ and so both unskilled choosers and professional colour specifiers alike will normally be obliged to make their choices of colour using colour samples of only small area. For convenience, the small colour samples should be small enough to be visible within a solid angle of vision of no greater than around 4° (and more preferably no greater than 2°) when held at normal reading distance (say 300 mm) from the eye. A sample 12 mm by 18 mm at 300 mm from the eye will subtend a solid angle of about 2°. Shifts in human perception become noticeable when the solid angle increases to above 10° and the shifts become very significant when the solid angles increase beyond 20°. The maximum field of comfortable vision is reached at solid angles of around 90° so outer areas requiring a larger solid angle of vision will not be comfortably seen in full and such outer areas will not significantly affect the physiological perception of the colour though they can have a psychological affect.

Commercial samples of coloured ceramics and plastics are often provided as collections of small plaques. Commercial samples of textile or paper colours are often provided as collections of small swatches of cloth or paper. Both plaques and swatches can become inconveniently bulky and heavy when formed into a collection unless they are of small area.

Commercial collections of small colour samples of paints and similar coating compositions such as varnishes and woodstains used by professional specifiers typically contain colour samples as small as 12 mm by 18 mm such as those found in the NCS Colour Atlas available as Swedish Standard SS 01 91 02 published in 1986. Small colour samples are frequently printed and provided in books such as the NCS Atlas or in databases embodied in fan decks such as the NCS Index available from the Scandinavian Colour Institute of Stockholm. Commercial collections of small area samples also appear in other atlases including the "The Master Palette Atlas" published in 1992 and available from ICI Paints of Slough, England and other fan decks including the "Dulux" "Colour Palette" fan decks also available from ICI Paints, the British Standard Fan Deck BS5252F:1976, and the Akzo Colour Bank believed to be available from Crown Paints of Darwen, England. Other commercial sources of standard collections of colours include the RAL Farbvorlagen which is a database made by the Deutsches Institut für Gütesicherung und Kennzeichnung EV of Sankt Augustin, Germany or the "Pantone" colours which form a database made by Pantone Incorporated of Carlstadt, N.J., USA. Finally there is also the Munsell database of colours. The contents of the above mentioned atlases, fan decks and databases are herein incorporated by reference.

It has now been discovered that the shift in human perception of colour has two main causes. Firstly, when a colour extends over a large area (say a wall having an area of 4 by 3 metres), the colour will be subject to a mixed illumination coming both directly from an illuminant (which will frequently be sunlight or a white illuminant) and from the light reflected from adjacent surfaces such as the adjacent walls or ceiling in a room. Mixed illumination causes significant shifts in the human perception of colours when the colours extend over a large area, but it has been discovered that mixed illumination does not noticeably shift human perception of colours when the colours only extend over a small area and so they remain reliably perceived as their true colours.

Mixed illumination will also cause different zones of a large area of colour to be seen differently by the human eye even though the same coloured material has been imparted to the entire area. The juxtaposition of these zones complicates the mind's psychological interpretation of what is being seen physiologically and this causes an intuitive psychological integration of the colours which then adds to the shift in the ultimate human perception of the colour.

The second cause of the colour shift problem occurs because a colour sample of small area will be fully visible within a solid angle of vision of 2° and so will be seen using only the sensitive fovea of the human eye. If colour extending over a much larger area is to be fully observed, it will often require a solid angle of vision of over 20° and up to the maximum of about 90°. In this range of greater solid angles, peripheral vision using other portions of the retina will become important to the eye's vision of the colour. These other portions of the retina have different sensitivities and so their involvement in the vision will lead to a further shift in the physiological perception of the colour.

Professional colour specifiers develop (possibly sub-consciously) an intuitive but unguided personal skill and experience which enables them to visualise the extent to which their perception of colour will shift between the true colour they perceive when the colour extends over a small area and the shifted colour they will perceive when it extends over a large area. But even then, the size of large areas can vary enormously from say 5 m² for a small room in a private house to thousands of square metres for the wall of a hall in a public building. Such wide variations in area allow scope for very different degrees of mixed illumination which gives even professional specifiers difficulty in visualising the shifts reliably if their visualisations are unguided. More problematically, if the choice of colour is made by an unskilled chooser with no special experience of colour using a collection of small colour samples, then the shift in perception will be totally unexpected because the unskilled chooser is unlikely to remember having experienced the shift before.

The above new insights into the shifts in human perception of colour establish that the causes are partly physical because of mixed illumination, partly physiological because of the variation in the sensitivity of the retina and partly psychological because the untrained mind tries to perceive just one colour. The physiological and psychological causes mean that attempts to compensate for and/or predict the shifts cannot rely solely on scientific instruments, but must at some stage involve human judgement by persons of normal colour vision. It is an object of this invention to provide a method for compensating for the shifts in human perception of colour which occur when a true colour extends over a large surface area so that the colour will be perceived as expected by the human mind when the expectation has arisen because the choice of colour has been made using a small colour sample. Despite involving human judgement, the method has been found to offer a consistent way to take account of these shifts in the human perception of colour. It is also an object of this invention to provide a method for predicting such shifts in the human perception of colour. A further object is to provide apparatus for facilitating the performance of the above methods. Yet another object, is to provide an assembly of different small colour samples from which a choice of colour can be made wherein for each of the colours in the assembly, the assembly either indicates how to compensate for the shift in the human perception of the colour or it predicts the amount of shift to be expected or it does both.

Colour is often defined in terms of its CIELAB lightness value, $L^*$, its CIELAB chroma value, $C^*$ and its CIELAB hue value, h. "CIE" stands for the Commission Internationale de l'Eclairage and its CIELAB $L^*$, $C^*$ and h values are well known and widely used. "Lightness", $L^*$, is a measure of the amount of light reflected from a surface and "chroma", $C^*$, is a measure of the intensity of a colour, ie. the extent to which it is either a pastel colour or a strong colour or something in between. "Hue", h, is a measure of how reddish, yellowish, greenish or bluish a colour is.

Accordingly, this invention provides a method for compensating for shifts in human perception of colour which occur when a colour initially perceived as a small colour sample is then perceived extending over a large surface area wherein the method includes a) obtaining the CIELAB lightness value $L_s^*$ and the CIELAB chroma value $C_s^*$ of the colour of the small colour sample (ie. the true colour of the sample), b) choosing a second colour of hue similar to the hue of the small colour sample which second colour has CIELAB lightness and chroma values $L_u^*$ and $C_u^*$ which are respectively less than $L_s^*$ and $C_s^*$ but where $L_u^*$ lies within the shaded area shown in FIG. 2 of the Drawings and where $C_u^*$ lies within the shaded area shown in FIG. 3 of the Drawings and c) imparting the second colour to the large surface area whereby because of the shift in human perception, the second colour when imparted to the large surface area is perceived by the human mind as being acceptably similar to the colour of the small colour sample. In short, the imparted second colour is perceived as having the expected $L_s^*$ and $C_s^*$ values of the small colour sample even though its true values, $L_u^*$ and $C_u^*$, are less than $L_s^*$ and $C_s^*$ with the result that the choice and imparting of the second colour acceptably compensates for the shift in perception. Preferably the CIELAB hue value of the second colour should differ from the true hue value of the colour of the small colour sample by no more than 5%, more preferably by less than 3% and if possible the hues should be the same.

The invention has been described primarily in terms of operations performed using the lightness, chroma and hue values $L^*$, $C^*$ and h because these values offer definitions of colour which are both precise and more easy to understand intuitively than definitions which employ other possible parameters such as the CIE tristimulus values, X Y Z, the CIE $L^*$ $a^*$ $b^*$ values, the $L^*$ $u^*$ $v^*$ values or the RGB values. However, if required, the invention can be adapted for use with these other parameters because essentially what is needed is any precise definition of lightness and chroma. Nevertheless, the adaptation will create more complex mathematics and will require corresponding adaptations to FIGS. 2, 3 and 4.

Precise relationships exist between $L^*$, $C^*$, h and all these other parameters for example $$L^* = 116(Y/Y_n)^{1/3} - 16 \text{ and}$$

$$C^* = (a^{*2} + b^{*2})^{1/2}$$

where in most cases $a^* = 500[(X/X_n)^{1/3} - (Y/Y_n)^{1/3}]$
$b^* = 200[(X/X_n)^{1/3} - (Z/Z_n)^{1/3}]$
$h = \tan^{-1} a^*/b^*$ and $X_n$, $Y_n$ and $Z_n$ are the tristimulus values for the CIELAB reference white light.

Clearly therefore, the properties defined by L*, C* and h could all be expressed equally precisely by these other related parameters, but at a cost of increased complexity.

Preferably the above method is refined by replacing step b by the following steps b(i) to b(v):

b(i) choosing a second colour of hue similar to the hue of the small colour sample which second colour has CIELAB lightness and chroma values, $L_u^*$ and $C_u^*$, which values are respectively less than $L_s^*$ and $C_s^*$, where the choice is made by performing steps b(ii) to b(v), b(ii) in FIG. 2 referring to the horizontal axis representing $L_s^*$ and noting the co-ordinate, $L_{ux}^*$ of any point where the $L_s^*$ axis crosses a boundary of a shaded area shown in FIG. 2, b(iii) in FIG. 3, referring to the horizontal axis representing $C_s^*$ and noting the co-ordinate, $C_{ux}^*$ of any point where the $C_s^*$ axis crosses a boundary of the shaded area shown in FIG. 3 then b(iv) either:
if there are two $L_{ux}^*$ co-ordinates noted, choosing a value for $L_u^*$ lying between them or
if there is only one $L_{ux}^*$ co-ordinate noted, choosing a value for $L_u^*$ lying between 0 and the $L_{ux}^*$ co-ordinate noted and b(v) either:
if there are two $C_{ux}^*$ co-ordinates noted, choosing a value for $C_u^*$ lying between them or
if there is only one $C_{ux}^*$ co-ordinate noted, choosing a value for $C_u^*$ lying between 40 and the $C_{ux}^*$ co-ordinate noted.

Preferred values for $L_u^*$ and $C_u^*$ lie from 30 to 70% of the distance between the pairs of extreme values mentioned above and where possible $L_u^*$ and $C_u^*$ should be about equidistant between the two extremes, that is to say from 45 to 55% of the distance between the extremes. Inclusion of the above preferences results in the imparted second colour being perceived as being much closer to the true colour of the initially perceived small sample. The most preferred values for $L_u^*$ and $C_u^*$ lie respectively on curve 23 in FIG. 2 and on line 33 in FIG. 3.

The shaded areas in FIGS. 2 and 3 can be mapped out using a technique employing the human judgements of several observers (preferably from 5 to 15) all of whom have normal colour vision preferably to the extent that they can each pass the Ishihara colour vision test.

A suitable mapping technique begins with imparting in turn to a large surface area a plurality (preferably 7 to 15) of different colours. The true (ie unshifted) CIELAB lightness and chroma values of each imparted colour will be called $L_u^*$ and $C_u^*$ and they should be already known or subsequently determined as explained later. When a colour has been imparted to the surface of large area, its humanly perceived (ie. shifted) CIELAB lightness ($L_s^*$) and chroma ($C_s^*$) values are determined by requiring each observer in turn to use his/her judgement to match their perceptions of its lightness and chroma values to the lightness and chroma values of one of a large range of possibly matching small colour samples displayed as alternatives using either a cathode ray tube monitor or a viewing cabinet. (A suitable viewing cabinet or "colour reference box" is described by Monica Billger on pages 214 to 225 of Volume 25 No. 3 of "Colour Research and Application" of June 2000, the contents of which pages are herein incorporated by reference). The small colour samples displayed on the monitor should preferably extend over an area of 80 mm square and subtend a solid angle of not more than about 2° to the observer's eye whilst slightly larger (but still small) colour samples displayed in the viewing cabinet should preferably extend over a rectangular area 12 mm by 18 mm and should subtend a solid angle of not more than about 10°. The true lightness and chroma values for each matching small colour sample should be already known or subsequently determined.

Each observer selects from the monitor or the viewing cabinet, the small colour sample which he/she regards as the best match for his/her perception of each colour imparted to the large surface area. Preferably, the observers make two matches for each imparted colour, one using the monitor and one using the viewing cabinet so in fact they will select two matching colours which will be very similar but seldom, if ever, exactly the same. The employment of human observers instead of solely scientific instruments to perform the matching enables account to be taken of the physiological and psychological factors which shift the human perception of colour.

The true lightness and chroma values of the matching small colour samples will be denoted $L_s^*$ and $C_s^*$ because they have been found to be extremely good approximations for the shifted lightness and chroma values of their matching imparted colours as perceived by a particular human observer. The arithmetic mean of all the results obtained from all the observers is determined.

Preferably an enhanced allowance for the effects of mixed illumination should be made by repeating the above matching procedure for perceptions of the colour on more than one zone (say 3 to 7 zones) of the large surface area.

A plot of the various mean shifted lightness and chroma values, $L_s^*$ and $C_s^*$ (obtained by the matching procedure) for zones of the imparted colours against the corresponding true (ie. unshifted) values, $L_u^*$ and $C_u^*$ of those colours will map out the broad form of the shaded areas shown in FIG. 2 or 3 respectively.

It was discovered that when shifted hue angles, $h_s$, were plotted against true (ie. unshifted) hue angles, $h_u$, the plots lay on or very close to a 45° line showing that there was virtually no shift in hue. This means that the extent of the shift in perception can be determined solely by operating on the true lightness and chroma values of small area sample colours which is an important discovery because it was also found that there were only small variations between human observers when it was only lightness and chroma which they were matching. In contrast, it is well known that human observers vary widely in their perception of hue.

If they need to be measured, CIELAB lightness values (L*), chroma values (C*) and hue angles (h) may be easily calculated from the measurements in $cd/m^2$ (candela/$m^2$) of their X, Y, Z tristimulus values made using a tele-spectroradiometer such as a Minolta CS1000 and the equations quoted earlier. However true CIELAB values are very likely to be known already because the chosen colours and/or the matching colours will often belong to one of the many established collections of small colour samples which either quote CIELAB lightness, chroma and hue values directly or give related parameters from which the CIELAB lightness and chroma values can be easily calculated.

If required, a further adjustment for the affects of mixed illumination can be made by reference to the shift in colour undergone by a white surface when the surface is placed in the mixed illumination. The white surface is assumed to have a true lightness value of essentially 100 and a true chroma value of essentially 0 and the illuminant is a reference source having tristimulus values denoted by $X_w$, $Y_w$ and $Z_w$. When in the mixed illumination, the tristimulus values of such a white surface will shift and, for the purposes of this description, the shifted values will be denoted as $X_x$, $Y_y$ and $Z_z$. These shifted tristimulus values, $X_x$, $Y_y$ and $Z_z$, of the white surface may be determined using a procedure described by Sueeprasan et al. on pages 316 to 320 of the Proceedings of the 9$^{th}$ IS&T/SID Colour Imaging Conference in 2001, the contents of which pages are herein incorporated by reference. Their procedure employs the following definitions of $X_x$, $Y_y$ and $Z_z$:

$$X_x = fX_w + (1-f)X, Y_y = fY_w + (1-f)Y \text{ and } Z = fZ_w + (1-f)Z \quad \text{Equations 1}$$

where X, Y and Z are the true tristimulus values of the colour imparted to the large surface area, ie. the values measured by scientific instruments. The constant "f" is a parameter determined by mathematical optimisation during a modelling process in which numerous colours having known X, Y and Z values were selected and their $X_x$, $Y_y$ and $Z_z$ values under two different sets of mixed illuminations were measured empirically and then the results were used to create models for the Equations 1 from which an optimum value for "f" was deduced. The $X_x$, $Y_y$ and $Z_z$ values calculated according to Equations 1 can then be used instead of the $X_n$, $Y_n$ and $Z_n$ thereby adjusting the CIELAB a* and b* values related to the shifted values $L_s^*$ and $C_s^*$ making possible an adjustment of $L_s^*$ and $C_s^*$ to take account of mixed illumination.

It is also preferred to improve the mapping procedure by using two or more different illuminants of different emissions even though this doubles the number of values of $L_s^*$ and $C_s^*$ which will be plotted. Fortunately, although the amount of light energy reflected by a surface will vary with the power of the illuminants, the power of the illuminants does not cause any significant shift in human perception because the ratio of the amounts of energy per unit area reflected by small and large areas does not vary and it is this ratio which is interpreted by the human mind when it is noticing the shift in colours.

It has been appreciated that the consistency of the results obtained from the methods of this invention arises at least in part because of four main factors. The first factor is the absence of a shift in hue angle. The second is the high degree of agreement between different human observers in their perception of lightness and chroma. The third is the way in which the human eye and mind have been found to cope with variations in the intensity of illumination and the fourth is the lack of any affect on the perception small colour samples attributable to mixed illumination.

Inspection of the location of the plots of the various shifted lightness values, $L_s^*$, against the corresponding true (ie. unshifted) values $L_u^*$ as shown in FIG. 2 reveals a non-linear trend in the scatter of the locations. Such a trend suggested that it could be worthwhile to attempt to find a "best-fit" curve for the locations of the plots which would be representable by a quadratic equation. An equation having the following quadratic form was investigated:

$$L_s^* = \alpha_L L_u^{*2} + \beta_L L_u^* + 100(1 - 100\alpha_L - \beta_L) \quad \text{Equation (2)}$$

where $\alpha_L$ and $\beta_L$ are constants to be determined as explained below.

Clearly, if $\alpha_L$ and $\beta_L$ are known and if $L_u^*$ is known for a particular small colour sample, then Equation 2 can be used to predict the shifted CIELAB lightness value for that colour when imparted to a large surface area. The predicted value will be denoted $L_{sp}^*$ so that $$L_{sp}^* = \alpha_L L_u^{*2} + \beta_L L_u^* + 100(1 - 100\alpha_L - \beta_L)$$

Correspondingly if a colour, when imparted to a large surface area, is expected to have a lightness value of $L_s^*$ then, in order to compensate for the shift, it would be necessary to impart a colour having a true lightness value of $L_{ut}^*$ where $$L_{ut}^* = \frac{-\beta_L + \{\beta_L^2 + 4\alpha_L[100(1 - 100\alpha_L - \beta_L) - L_s^*]\}^{1/2}}{2\alpha_L} \quad \text{Equation (2a)}$$

So if the expected lightness, $L_s^*$, is known for a particular expected colour, then Equation 2a can be used to predict and identify the small colour sample whose the lightness $L_{ut}^*$ will be perceived as $L_s^*$ when the colour of the sample is imparted to the large surface area.

In order to arrive at a best-fit curve and therefore the best values for $\alpha_L$ and $\beta_L$, the following preferred "best-fitting" procedure was followed:

In Step 1 of the preferred best-fitting procedure, a first pair of tentative values for $\alpha_L$ and $\beta_L$ were selected and substituted into Equation (2). Then a known true lightness value, $L_u^*$, of an imparted colour was also substituted into Equation (2) and the equation was used to predict a shifted value, $L_{sp}^*$. Next, the lightness value, $L_s^*$, of the matching small colour sample was subtracted from the predicted value for the chosen colour, $L_{sp}^*$, and the difference obtained was squared, giving $$(L_{sp}^* - L_s^*)^2.$$

Step 2 of the best-fitting procedure was to repeat Step 1 for the corresponding true and shifted lightness values of each of the other imparted colours. Step 3 was to repeat Steps 1 and 2 together using in turn one of numerous guessed alternative tentative values for $\alpha_L$ and $\beta_L$. Steps 1 to 3 together produced a list of squared differences $(L_{sp}^* - L_s^*)^2$ for each of alternative pairs of tentative values for $\alpha_L$ and $\beta_L$ used in Steps 1 or 2. The squared differences making up a list were added together giving the sum of all the squared differences $(L_{sp}^* - L_s^*)^2$ in that list. The list having the lowest sum was deemed to have the best-fitting values for $\alpha_L$ and $\beta_L$ and these were substituted into Equation (2) which was then constrained to pass through the point of total lightness, $L_{sp}^* = 100 = L_u^*$. This constrained curve was deemed to be a best-fitting curve. Early repeated performances of the best-fitting procedure resulted in a range of acceptable alternative values for $\alpha_L$ of from −0.007 to −0.0001, preferably less than −0.0013 and in a range of acceptable alternative values for $\beta_L$ of from 0.8 to 1.5, preferably 0.75 to 0.95.

Substitution of preferred pairs of upper and lower values for $\alpha_L$ and $\beta_L$ into Equation 2 produces upper and lower quadratic curves respectively as shown in FIG. 2 which bound areas of shifted lightness values useful in the performance of this invention.

A similar inspection of the location of the plots of the various predicted shifted chroma values, $C_s^*$ against the corresponding true (ie. unshifted) values of $C_u^*$ as shown in FIG. 3 revealed a linear trend in the scatter of the locations. Such a trend suggested that it could be worthwhile to attempt to find a "best-fit" line for the locations of the plots which would be representable by a linear equation. An equation having the following form was investigated:

$$C_s^* = \alpha_C C_u^*$$ Equation (3)

where $\alpha_C$ is a constant to be determined as explained below.

Clearly, if $\alpha_C$ is known and if $C_u^*$ is known for a particular small colour sample, then Equation 3 can be used to predict the shifted CIELAB chroma value $C_{sp}^*$ for that colour, ie $$C_{sp}^* = \alpha_C C_u^*$$

Correspondingly if a colour, when imparted to a large surface area, is expected to have a chroma value of $C_s^*$ (ie. a shifted value of $C_s^*$) then, in order to compensate for the shift, it would be necessary to impart a colour having a true chroma value of $C_{ut}^*$ where $$C_{ut}^* = \frac{C_{sp}^*}{\alpha_C}$$ Equation (3a)

The constant, $\alpha_C$ can be determined by a best-fitting procedure analogous to the one described for determining $\alpha_L$ and $\beta_L$ but with chroma values replacing lightness values and with the line being constrained to pass through the point of total achromaticity, $C_{sp}^* = 0 = C_u^*$. Repeated performances of the best-fitting procedure have resulted in a range of acceptable alternative values for $\alpha_C$ of from 1 to 2.3 and preferably 1.05 to 1.9.

Substitution of preferred upper and lower values for $\alpha_C$ into Equation 3 produces upper and lower lines as shown in FIG. 3 which bound areas of shifted lightness values useful in the performance of this invention.

The above equations can be used in directly compensating for the above described shifts in the human perception of colour. Accordingly, this invention provides a method for compensating for the shifts in human perception of colour which occur when a colour initially perceived as a small colour sample is then perceived extending over a large surface area wherein the method includes a) obtaining the true CIELAB lightness value $L_s^*$ and the CIELAB chroma value $C_s^*$ of the colour of the small colour sample (ie. the true colour of the sample), b) choosing a second colour of hue similar to the hue of the small colour sample which second colour has CIELAB lightness and chroma values $L_u^*$ and $C_s^*$ where $$L_u^* = \frac{-\beta_L + \{\beta_L^2 + 4\beta_L[100(1 - 100\alpha_L - \beta_L) - L_s^*]\}^{1/2}}{2\alpha_L}$$

and $$C_{ut}^* = \frac{C_{sp}^*}{\alpha_C}$$

in which
  $\alpha_L$ is from −0.007 to −0.0001
  $\beta_L$ is from 0.8 to 1.5 and
  $\alpha_C$ is from 1 to 2.3
and
c) imparting the second colour to the large surface area whereby because of the shift in human perception, the second colour when imparted to the large surface area is perceived by the human mind as being acceptably similar to the colour of the small colour sample.

The method can also be performed in reverse so that it is possible to predict how a true colour (as illustrated for example by a small area colour sample) will be perceived by the human mind when the true colour extends over a large area surface. Accordingly, this invention provides a method for predicting shifts in human perception of colour which occur when a colour initially perceived as a small colour sample is then perceived extending over a large surface area wherein the method includes a) obtaining the true CIELAB lightness value $L_u^*$ and the CIELAB chroma value $C_u^*$ of the colour of the small colour sample, b) increasing the CIELAB lightness and chroma values $L_u^*$ and $C_u^*$ to values $L_s^*$ and $C_s^*$ which lie respectively within the shaded areas shown in FIG. 2 and FIG. 3, whereby because of the shift in human perception, the increased values $L_s^*$ and $C_s^*$ predict the lightness and chroma which the colour will be perceived to have when it extends over a large surface area.

The invention provides an alternative method for predicting the shifts in the human perception of colour which occur when a colour initially perceived as a small colour sample is then perceived extending over a large surface area wherein the method includes a) obtaining the true CIELAB lightness value $L_u^*$ and the CIELAB chroma value $C_u^*$ of the colour of the small colour sample, b) increasing the CIELAB lightness and chroma values $L_u^*$ and $C_u^*$ to values $L_s^*$ and $C_s^*$ where $$L_s^* = \alpha_L L_u^{*2} + \beta_L L_u^* + 100(1 - 100\alpha_L - \beta_L) \text{ and}$$

$$C_s^* = \alpha_C C_u^*$$

whereby because of the shift in human perception, the values $L_s^*$ and $C_s^*$ predict of the lightness and chroma which the colour will be perceived to have when it has been imparted to the large surface area.

An ability to predict these shifts in the human perception of colour enables the shifts to be illustrated, preferably alongside the corresponding small colour samples, so as to show to both professional specifiers and unskilled choosers how they will perceive the colour of the small colour sample when it has been imparted to the large surface area. Accordingly this invention provides a method for illustrating how the colour of a small colour sample will be perceived by the human mind when the colour extends over a large surface area wherein the method includes a) using a method as described above to predict the shifted lightness and chroma values, $L_s^*$ and $C_s^*$, for the small colour sample, b) choosing a second colour of hue similar to the hue of the small sample colour which second colour has the lightness and chroma values, $L_s^*$ and $C_s^*$ and c) imparting a small area of the second colour to carrier means whereby the combination of the carrier means and imparted second colour provide an illustration of how the colour of a small colour sample will be perceived by the human mind when the colour extends over a large surface area. Suitable carrier means include paper pages, cards or electronic means such as cathode ray screens.

Preferably for greater convenience in use, the carrier means also carries a sample of the small area colour adjacent the second colour. Accordingly, the invention further provides a combination of carrier means and a coloured material carried by the carrier and extending over a small area wherein the combination also includes a small sample of a first colour and the coloured material is of a second colour of similar hue to the first colour but whose lightness and chroma values, $L_s^*$ and $C_s^*$, are greater than the lightness and chroma values, $L_u^*$ and $C_u^*$, of the first colour and also lie within the shaded areas of FIGS. 2 and 3 respectively so that on viewing the sample colour in the combination, the human physiological and psychological perception of the first colour is modified by the presence of the coloured material causing a perception of the first colour as it would be perceived if it were extending over a large surface area. Alternatively in the combination the lightness value, $L_s^*$, and the chroma value, $C_s^*$, of coloured material may be given by the equations:

$$L_s^* = \alpha_L L_u^{*2} + \beta_L L_u^* + 100(1-100\alpha_L-\beta_L) \text{ and}$$

$$C_s^* = \alpha_C C_u^*$$

The first colours may be provided as displays on cathode ray screens but usually they are embodied as small area samples of colour printed on card or paper. Generally, each sample will be associated with an identification of its true colour and preferably the identification is printed on or near to the sample. For example, collections of small area samples of colours are commercially available and many have an identification of their true lightness and chroma values printed on them. The identification could be in the form of actual CIELAB lightness and chroma values as determined under standard CIE conditions, but commercially available samples will usually carry a precise translation of the colours into some more user-friendly colour-defining notation such as an NCS cypher or a Colour/Master Palette cypher or an analogous cypher.

The carrier means may likewise be a cathode ray tube when the coloured material will be the energy sensitive coating on the screen. The carrier means may also be card or paper with the colour material printed on it. This time, the coloured material may conveniently be associated with an identification of its shifted colour. In use, the carrier means and coloured material should be adjacent the small colour sample so that an unskilled chooser can see the whole combination easily. The identification of the shifted colour can then be printed on the small sample colour alongside the definition of its true colour to produce a bi-notated sample. In this way, someone referring to the bi-notated sample for assistance in the choice of colour will be able to see immediately a definition of which shifted colour will be needed to offset the shift in perceived colour.

For even greater convenience, the carrier means may carry a plurality of small colour samples each accompanied by its corresponding second colour so allowing a whole commercial range of colours to be displayed each with its corresponding second or shifted colour in for example stripe cards, a fan decks, a brochures, assemblies of ceramics or plastics plaques or books of textile samples or side by side on a cathode ray screen. This allows a user to see an actual small area display of the colour as it will appear on a large area and it is especially effective in alerting unskilled colour choosers to the phenomenon of the shift.

Factory made coloured coating compositions are usually supplied in cans big enough to contain enough of the coating composition to enable a large surface area to be coated. Cans containing coating compositions of different colours are often formed into collections and displayed together (eg side by side) in shops or trade stores so as to offer a range of alternative selectable colours. This invention enables each can in such a collection to serve as a component of a carrier means carrying an illustration of the shifted colour of the paint in the can. In this way, the unskilled chooser can make a choice from shifted colours displayed on the can so never needing to be concerned with true colours. However, in case a chooser wants a colour for imparting to only a small area such as door knob, it is desirable for each can also to be marked with the true colour (when dry) of the coating composition which it contains so that the person selecting a chosen colour can be aware of the true colour if needed. Representations of the true and shifted colours (for example small area samples of the colours) may be carried on the cans or alternatively, a can or a portion of it may be transparent or translucent so that the colour of its contents (albeit in an undried state) is visible through the can. A collection may be used in combination with a collection of small area samples of the shifted colours in which the colours are identified by reference to their true lightness and chroma values.

A modification of the arrangements described above comprises a display of a series of either small area sample colours or wholly or partially transparent cans filled with coloured materials where the second and subsequent samples in the series serve both as samples of a true colour and also as illustrations of the shifted colour for either the preceding or the following adjacent member of a series. For example, such a modified aid may comprise a ladder of colours where the top colour is a sample colour and the colour below it is its shifted colour. The colour below also serves as a second sample colour with the next colour down being its shifted colour and so on down the ladder. Alternatively, the bottom colour may be the lead reference colour with shifted colours being met as the ladder is ascended. A vertical ladder of colours is thought to be more easily understood intuitively, but the ladder could be displayed horizontally.

It may be of particular assistance to ordinary members of the public having no specialist colour skills if the shifted colours are displayed in a schematic diagram of a room usually created on a cathode ray tube. Display on a cathode ray tube allows the colour to be incorporated into a computer-manipulateable digital image of a room so that a true colour can be displayed on simulated walls or ceilings and then the image can be manipulated to display the appropriate shifted colour. Preferably the screen should subtend a solid angle of vision of at least 20° to an observer 300 mm away.

The invention further provides apparatus for facilitating the performance of the method for compensating for shifts in human perception of colour which occur when a colour initially perceived as a small colour sample is then perceived extending over a large surface area wherein the apparatus comprises a) means for storing the shaded area shown in FIG. 2 and means for storing the shaded area shown in FIG. 3,
b) means for storing or obtaining the CIELAB lightness value $L_s^*$ and the CIELAB chroma values $C_s^*$ of a small area sample colour,
c) means for choosing respectively from the shaded areas shown in FIGS. 2 and 3 a second colour of hue similar to the hue of the small colour sample which second colour has CIELAB lightness and chroma values $L_u^*$ and $C_u^*$ which are less than $L_s^*$ and $C_s^*$ respectively and
d) means for communicating the chosen values, $L_u^*$ and $C_u^*$ to a user of the apparatus thereby communicating a prediction of the lightness, $L_u^*$, and the chroma, $C_u^*$ of the colour that will need to be imparted to a large surface area in order for the colour to be perceived by the human mind as acceptably similar to the colour of unshifted lightness, $L_s^*$ and chroma, $C_s^*$ of the initially perceived small colour sample. Also provided is apparatus for facilitating the performance the method for predicting shifts in human perception of colour which occur when a colour initially perceived as a small colour sample is then perceived extending over a large surface area wherein the apparatus comprises a) means for storing the shaded area shown in FIG. 2 and means for storing the shaded area shown in FIG. 3,
b) means for storing or obtaining the CIELAB lightness value $L_u^*$ and the CIELAB chroma values $C_u^*$ of a small colour sample,
c) means for choosing respectively from the shaded areas shown in FIGS. 2 and 3 a second colour of hue similar to the hue of the small colour sample which second colour has CIELAB lightness and chroma values $L_s^*$ and $C_s^*$ which are greater than $L_u^*$ and $C_u^*$ respectively and
d) means for communicating the chosen values, $L_s^*$ and $C_s^*$ to a user of the apparatus thereby communicating a prediction of the shifted lightness, $L_s^*$, and the chroma, $C_s^*$ of the colour that will perceived by the human mind when the colour is imparted to a large surface area. In a particularly preferred modification, the colour communicated by the apparatus is communicated to a paint tinting machine, that is to say a machine which dispenses pre-determined amounts of colorant into neutrally coloured base paints or other coating compositions to create a pre-selected colour.

A preferred technique for mapping the shaded areas used in the performance of this invention will now be described with reference to the drawings in which FIG. 1 shows in perspective an assembly of planar surfaces which simulates the ceiling, walls and floor of a room.

Figure 1:
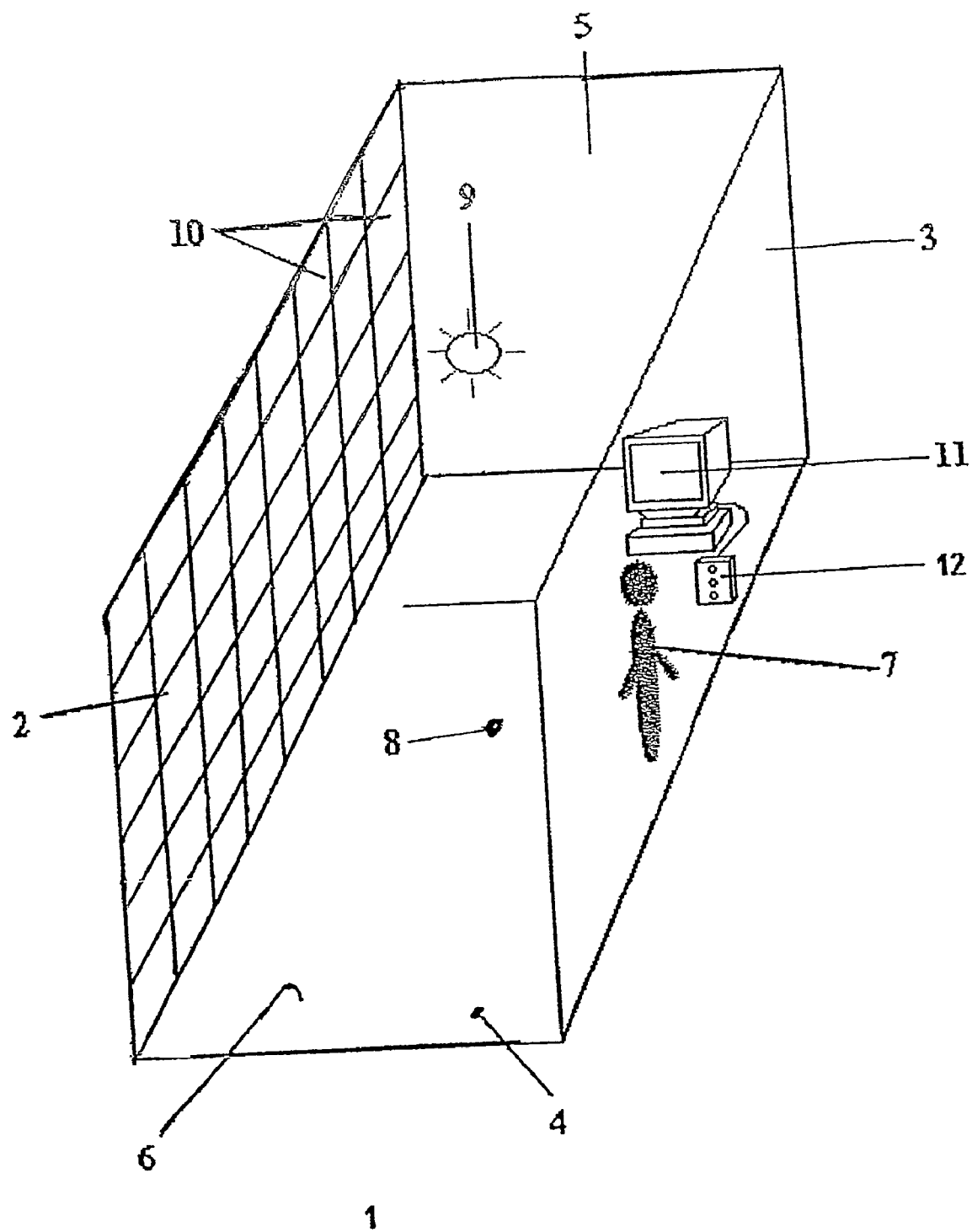
Figure 2:
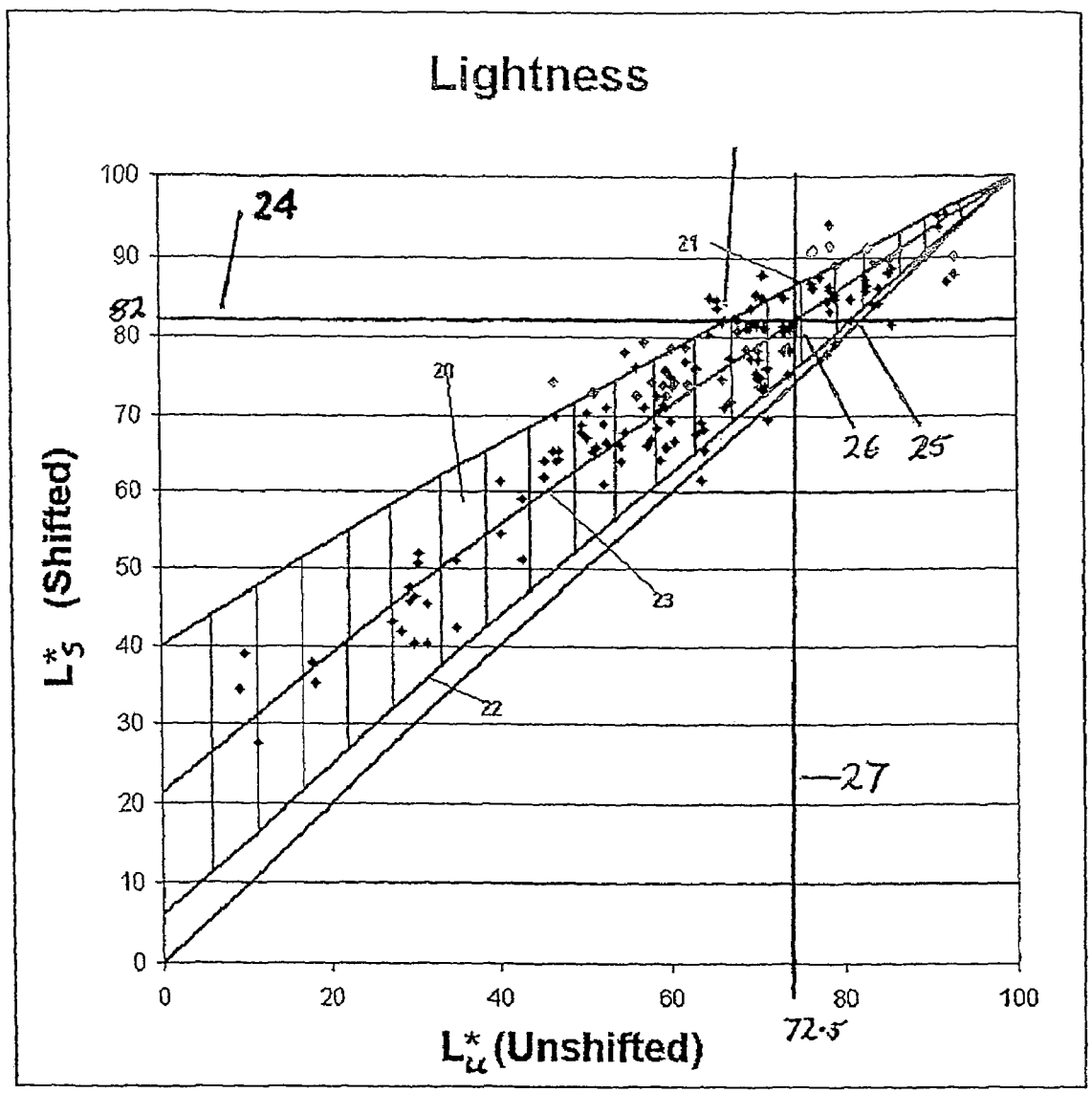
FIG. 2 shows plots of shifted lightness values $L_s^*$ of chosen colours as determined using the matching colours technique against the unshifted (true) lightness values $L_u^*$ of the chosen colours.
Figure 3:
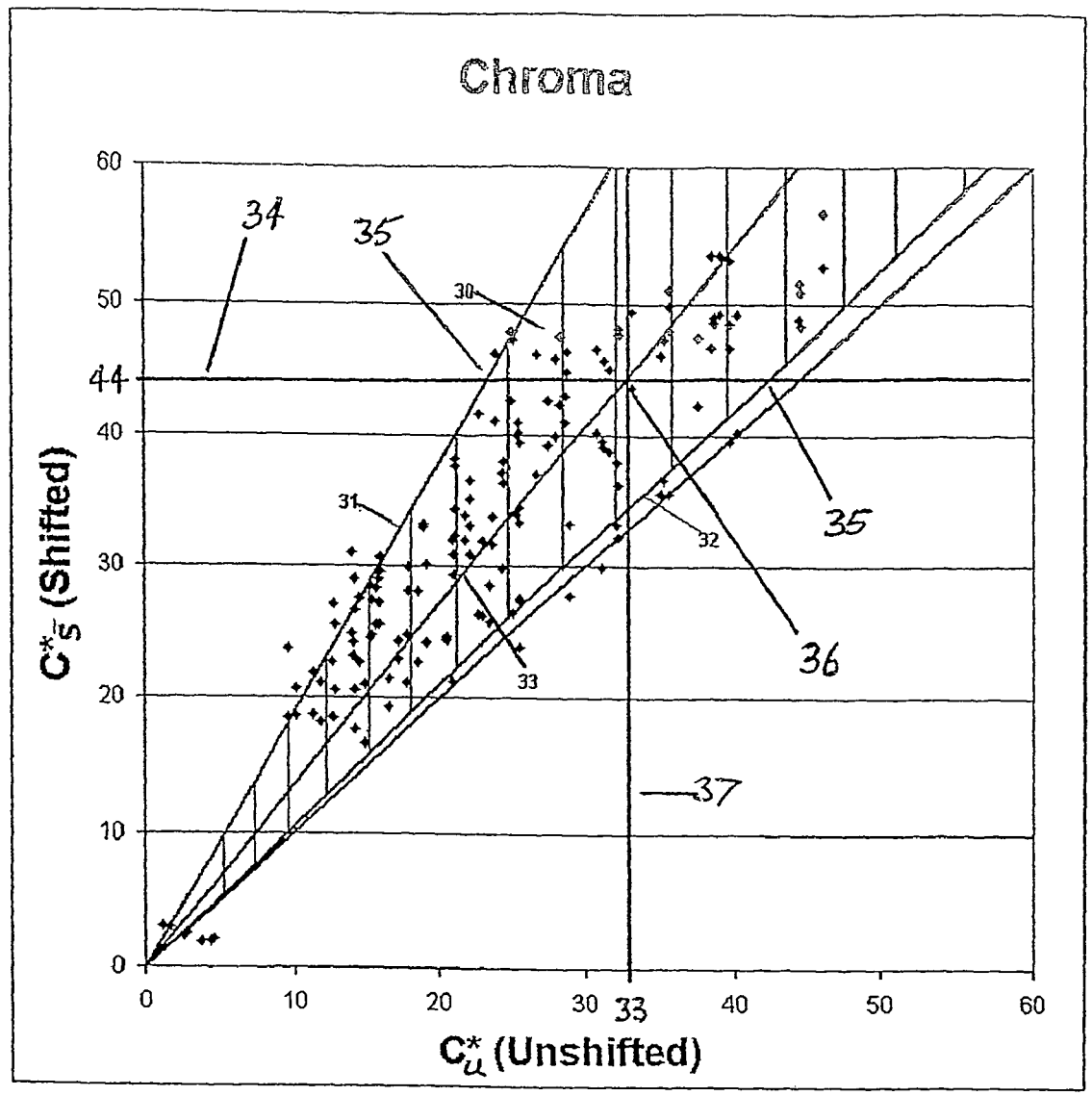
FIG. 3 shows plots of shifted chroma values $C_s^*$ of chosen colours as determined using the matching colours technique against the unshifted (true) chroma values $C_u^*$ of the chosen colours.
Figure 6:
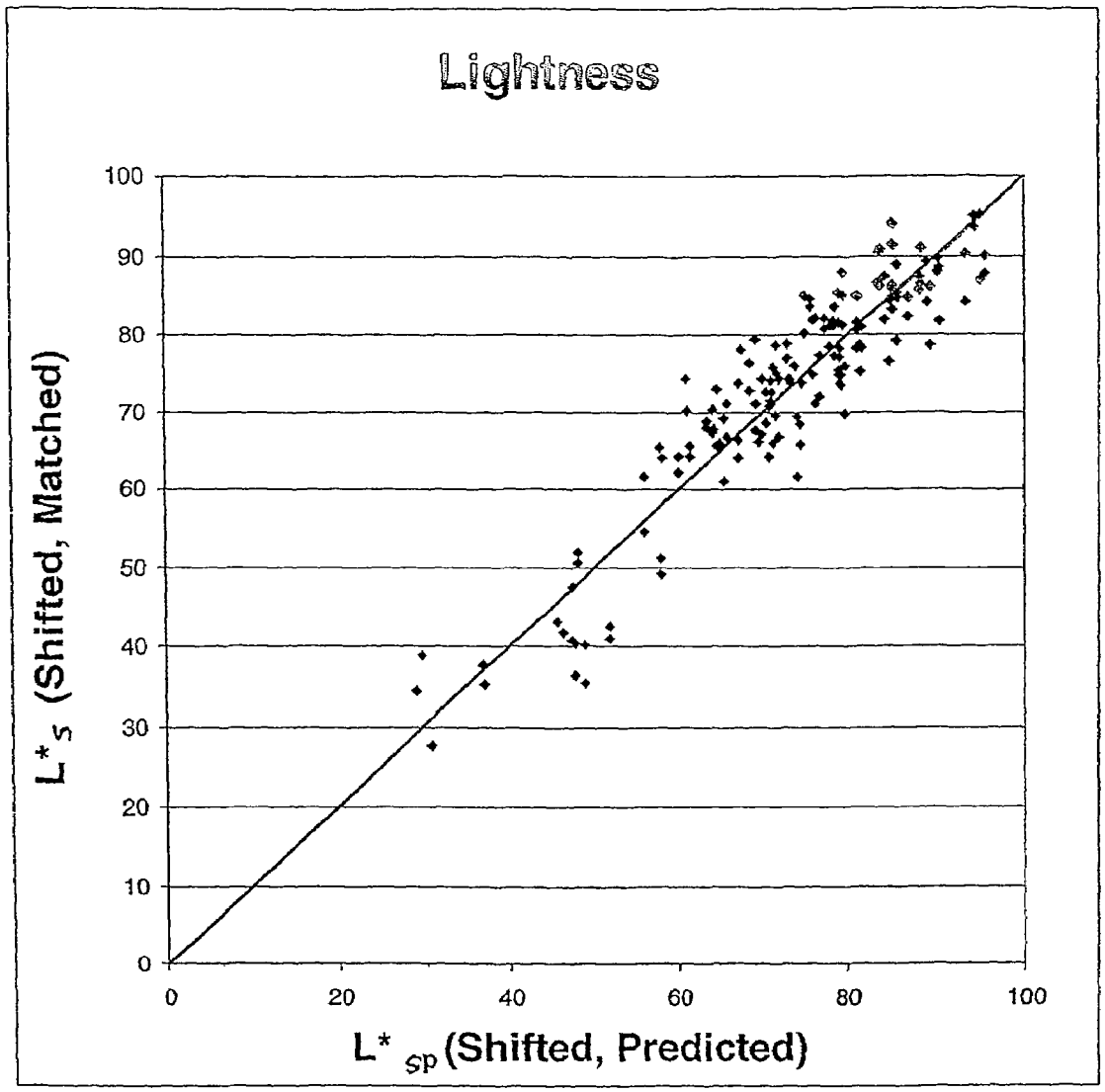
FIG. 6 shows plots of shifted lightness values, $L_s^*$, against predicted shifted lightness values, $L_{sp}^*$.

The preferred technique for mapping the shaded areas 20 and 30 shown in FIGS. 2 and 3 employed a simulated room 1 as shown in FIG. 1 and twelve different colours whose CIELAB a* and b* definitions are shown in FIG. 6.

Simulated room 1 comprised an assembly of vertical planar large surface areas or "walls" 2, 3 and 4 surmounted by a horizontal planar surface or "ceiling" 5 above a horizontal planar floor 6 covered by a mid-grey carpet, not shown. Walls 2 and 3 were 4 m long by 3 m high whilst walls 4 were 3 m long by 3 m high. Therefore walls 2, 3 and 4 all provided surfaces of large area and in particular wall 2 subtended a solid angle of vision of greater than 50° to an observer 7. Simulated room 1 and especially wall 2 was illuminated by a D65 white lamp 9 positioned centrally on ceiling 5. Lamp 9 had a colour temperature of 6427K. The tristimulus values, $X_n$, $Y_n$ and $Z_n$, of lamp 9 were $X_n$=94.86, $Y_n$=100 and $Z_n$=107.25.

Walls 2, 3 and 4 and ceiling 5 were newly painted matt white using a solvent-based alkyd paint of the type used as undercoating which therefore had a high covering power. The paint was allowed to dry for at least 16 hours and then each of the twelve alternative paints of different chosen chromatic or achromatic colours was painted in turn onto the white walls 2, 3 and 4. Ceiling 5 was left white. The true (ie unshifted) lightness and chroma values, $L_u^*$ and $C_u^*$, of the twelve colours are given in FIGS. 2 and 3 respectively. The true (ie. unshifted) lightness and chroma values of the chosen colours and their hue angles were already known and so did not need to be determined.

Wall 2, when painted in turn with each of the paints of a chosen colour, was notionally divided into 48 equal areas 10 which extended six high and eight lengthwise. The X, Y, Z tristimulus values for the colour of each area were measured using the Minolta CS 1000. It was found that the areas 10 could be grouped into either 3 or 4 zones of essentially uniform colour. The first of the ten observers 7 (all of whom were capable of passing the Ishihara vision test for normal human colour vision) was asked to observe each of the three or four zones of wall 2 in turn and then to match his/her perception of the colour of a zone with a colour displayed on a cathode ray tube 11. Cathode ray tube 11 was fitted with controls 12 which permit alternative colours of different lightness, chroma and/or hue to be displayed. The white point of cathode ray tube 11 had been set to match the white point of lamp 9. Observer 7 compared the colour of the zone with alternative colours displayed on tube 11 until in his/her judgement, a matching colour was found which, was the best available match for the colour of the zone being viewed. The tristimulus values of the matching colour were then measured using the Minolta CS1000. These values equate with those for the colours imparted onto the walls and so they were used to calculate shifted lightness and chroma values and shifted hue angles for the imparted colours.

The above matching procedure for obtaining lightness and chroma values for matching colours was repeated for all the three or four zones of essentially uniform colour and then repeated for each of the other eleven alternative colours and then repeated using a cool white fluorescent lamp of colour temperature 3820K as lamp 9 instead of the D65. This gave from 66 to 88 (depending on the number of zones of uniform colour) possible values for lightness, chroma and hue.

The entire procedure was then repeated except that the cathode ray tube was replaced by a viewing cabinet so doubling the number of readings obtained.

The viewing cabinet displayed in turn NCS small area colour samples of A6 size whose tristimulus values were already known and which subtended a solid angle of 2° to observer 7. Each observer 7 viewed a zone of wall 2 and compared it with an A6 NCS colour sample on display in the box. If the colour was not already, by chance, the best available match for the perceived colour of the zone, the A6 sample was replaced by a sample whose colour was judged by the observer to be closer to the perceived colour of the zone and so on until a satisfactory available match had been found. If no NCS sample colour was found which was a satisfactory match, the two NCS sample colours judged to be nearest to the perceived colour were selected and then measured by the Minolta CS1000 to determine their tristimulus values. A weighted average value was calculated for each pair of tristimulus values and the weighted averages were deemed to be the tristimulus values for the perceived colour. By "weighted average" is meant that if the perceived colour was judged to lie say nearer to the first colour and to lie say 25% of the distance in colour space from the first colour to the second, then the deemed values would comprise the sum of 75% of the tristimulus values of the first colour plus 25% of the tristimulus values of the second. Again the tristimulus values of the matching colours were used to calculate shifted lightness and chroma values and shifted hue angles for the imparted colours.

Finally the entire procedures were repeated by the nine other observers 7 and the lightness and chroma values found by all 10 observers were averaged arithmetically. The average values for the shifted lightness and chroma values, $L_s$* and $C_s$* were plotted respectively against the true (ie unshifted) lightness and chroma values, $L_u$* and $C_u$*, of the chosen colours and the plots are shown in FIGS. 2 and 3 respectively.

Inspection of FIG. 2 shows that the scatter of plots follows a trend in which the plots all show shifts from $L_u$* towards increased lightness values, $L_s$*, but the increase moderates as the lightness values approach 100. Therefore, the plots map out shaded area 20 which is bounded by an upper essentially quadratic curve 21 and by a lower essentially quadratic curve 22. Curves 23 are best fit curves obtained by minimising the sum of the squares of the differences between $L_s$* and $L_{sp}$* as explained earlier but with the curve constrained to pass through the point of total lightness, $L_s$*=100=$L_u$*. The best fit curves had the equation $$L_s^* = \alpha_L L_u^{*2} + \beta_L L_u^* + 100(1 - 100\alpha_L - \beta_L)$$

where $\alpha_L$ was 0.00125 and $\beta_L$ was 0.913.

The horizontal axis representing $L_s$*=82 is illustrated in FIG. 2 by horizontal line 24 which crosses the boundaries of shaded areas 20 at point 25. This means that useful values for $L_u$* lie on line 24 between points 25. The axis crosses the best fit curves 23 at point 26 giving an optimum value for $L_u$* of 72.5. This whole operation could be performed in reverse using for example a vertical axis representing $L_u$*=72.5 to obtain predicted shifted values $L_{sp}$* for a small sample colour of true lightness 72.5.

Inspection of FIG. 3 shows that the scatter of plots follows a trend in which the plots all show shifts from $C_u$* towards increased chroma values, $C_s$*. The increase moderates as the values approach 0. In FIG. 3 the plots map a triangular shaped shaded area 30 which is bounded by upper line 31 and by lower line 32. Line 33 is the best fit line obtained by minimising the sum of the squares of the differences between $C_s$* and $C_{sp}$* as explained earlier but with the line constrained to pass through the points of total achromaticity, $C_{sp}$*=0=$C_u$*. The best fit line had the equation $C_s^* = \alpha_C C_u^*$, where $\alpha_C$ was 1.358.

The horizontal axis representing $C_s$*=44 is illustrated in FIG. 3 by horizontal line 34 which crosses the boundaries of shaded areas 30 at points 35. This means that the most useful values for $C_u$* lie on line 34 between points 35. The axis crosses the best fit line 33 at point 36 giving an optimum value for $C_u$* of 33. This whole operation could be performed in reverse using for example a vertical axis representing $C_u$*=33 to obtain predicted shifted value $C_{sp}$* for a small sample colour of true chroma 33.

Figure 4:
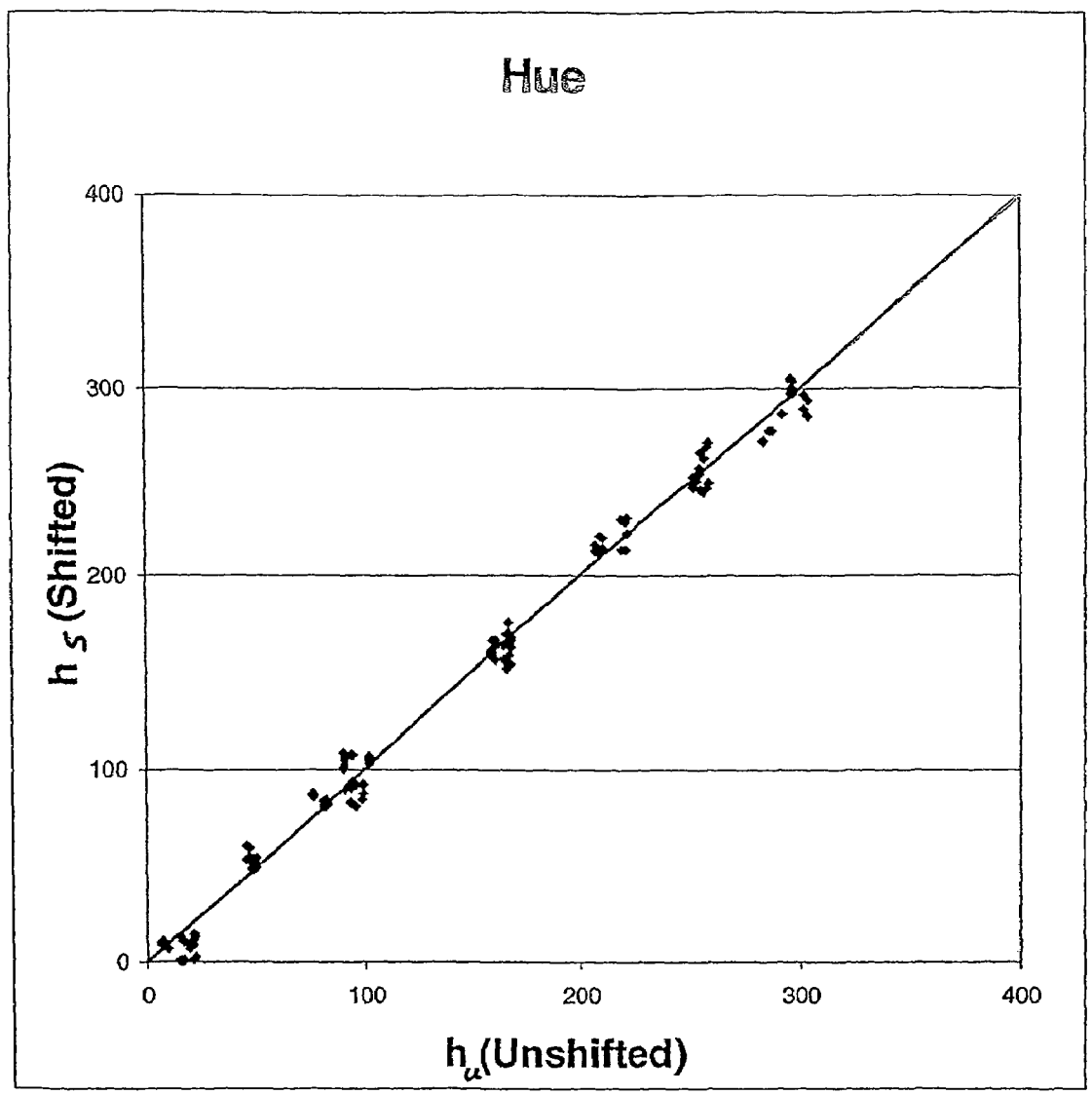
FIG. 4 shows plots of shifted hue angles $h_s$ of chosen colours as determined using the matching colours technique against the unshifted (true) hue angles $h_u$ of the chosen colours.
Figure 5:
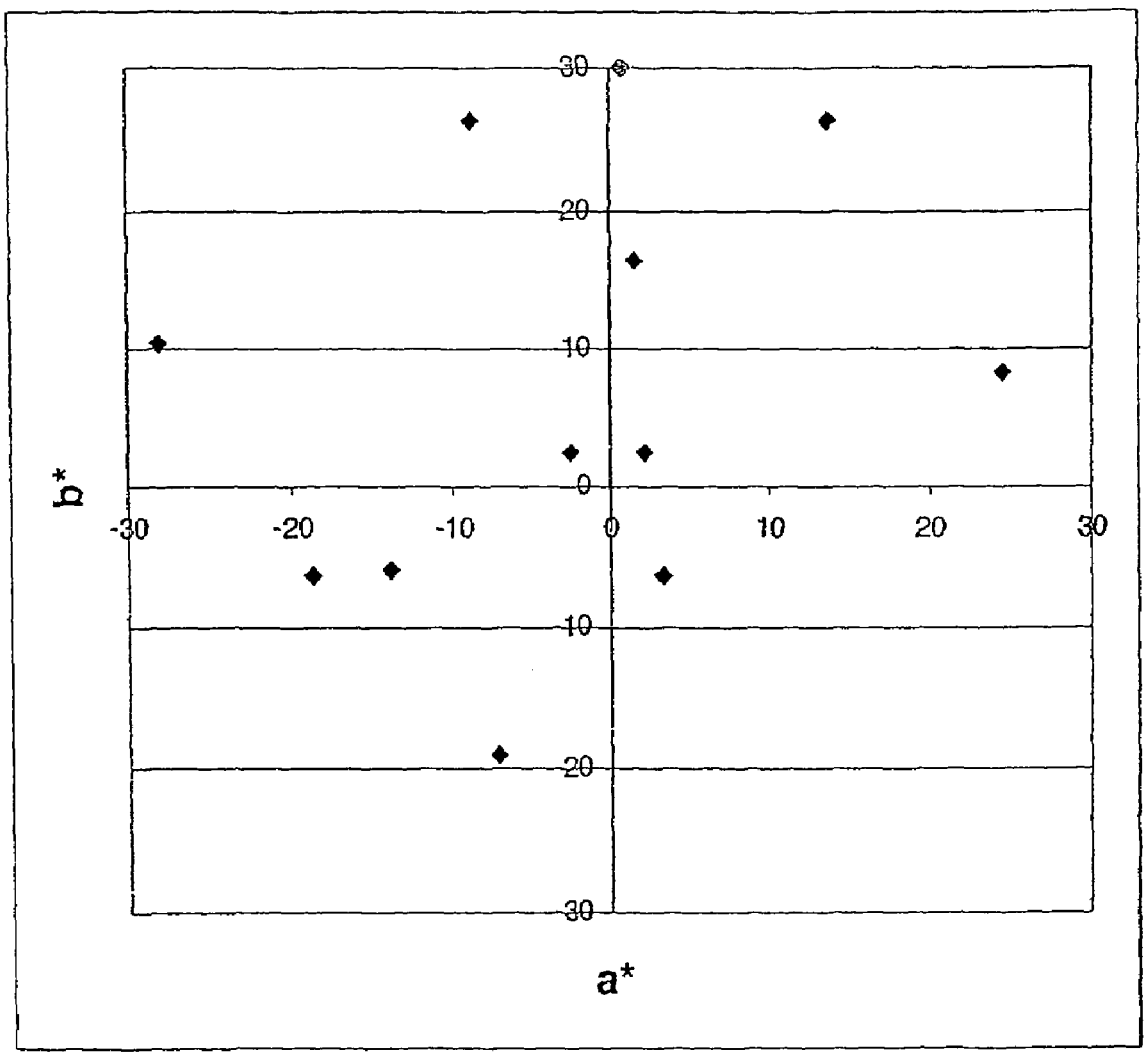
FIG. 5 shows plots on a CIE a*b* diagram of the a* and b* values of the twelve colours used to map the areas in FIGS. 2 and 3.

Inspection of FIG. 4 shows that the plots of hue, h, largely lie on the 45° line 40 which demonstrates that there is very little shift in perceived hue when a chosen colour is imparted to a large area.

In order to assess the accuracy of the predicted lightness and chroma values, the equations of the best fit curves for lightness and chroma were used to predict the shifted lightness and chroma values, $L_{sp}$* and $C_{sp}$* of several chosen colours created when the chosen colours were imparted to a surface of large surface. The chosen colours were painted in turn onto white undercoated wall 2 and their actual perceived lightness and chroma values, $L_s$* and $C_s$* were determined using the preferred matching technique described above. The predicted shifted values, $L^*_{sp}$ and $C^*_{sp}$, were then plotted against the actual values, $L_{sp}$* and $C_{sp}$*, obtained from the matching colours. The plots are shown in FIGS. 6 and 7.

Figure 7:
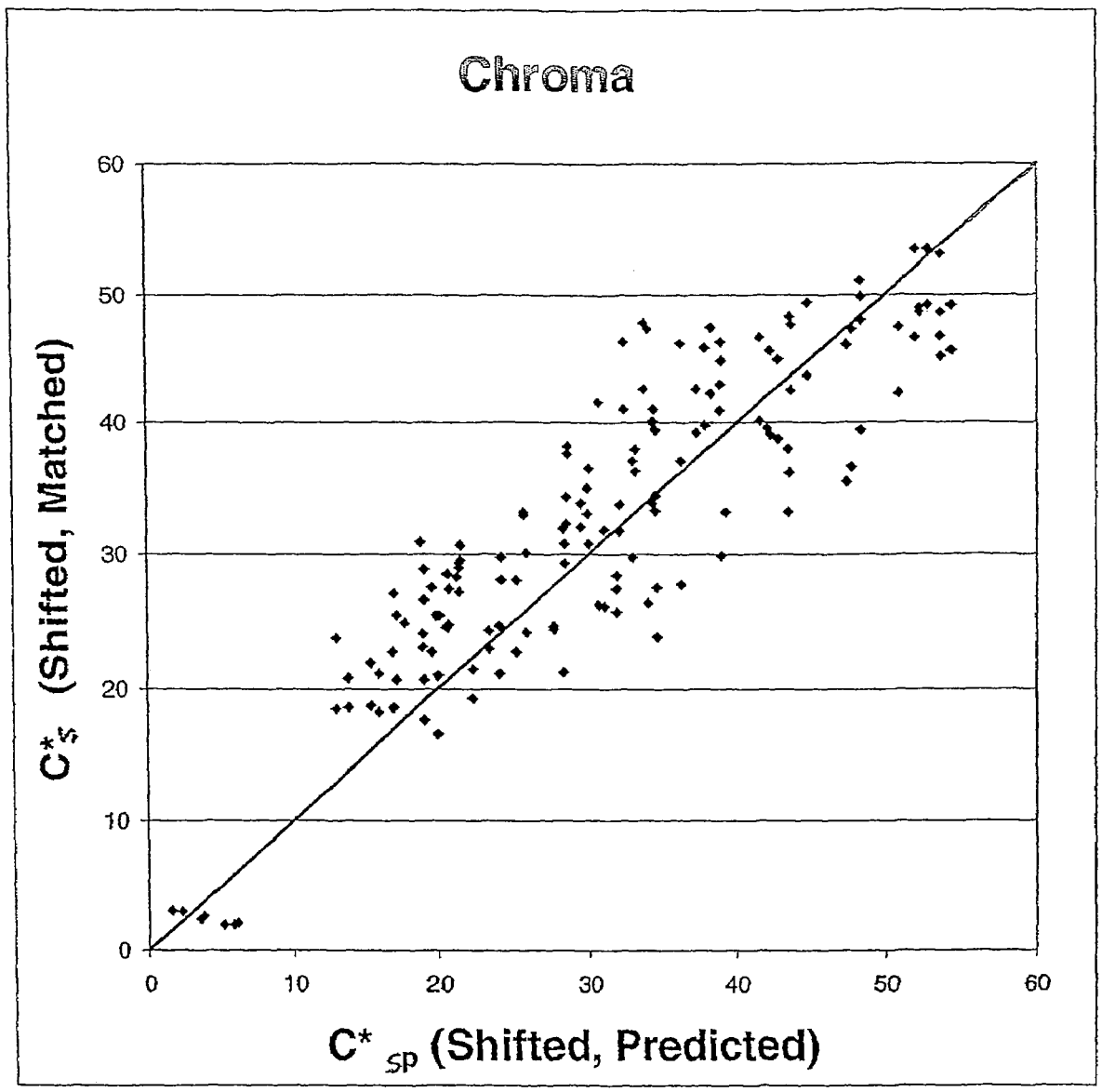
FIG. 7 shows plots of shifted chroma values, $C_s^*$, against predicted shifted chroma values, $C_{sp}^*$.

Both FIGS. 6 and 7 show that the plots follow closely the 45° lines 60 and 70 which indicates a good correlation between shifted values as measured and the shifted values as predicted using the best fit equations.

Figure 8:
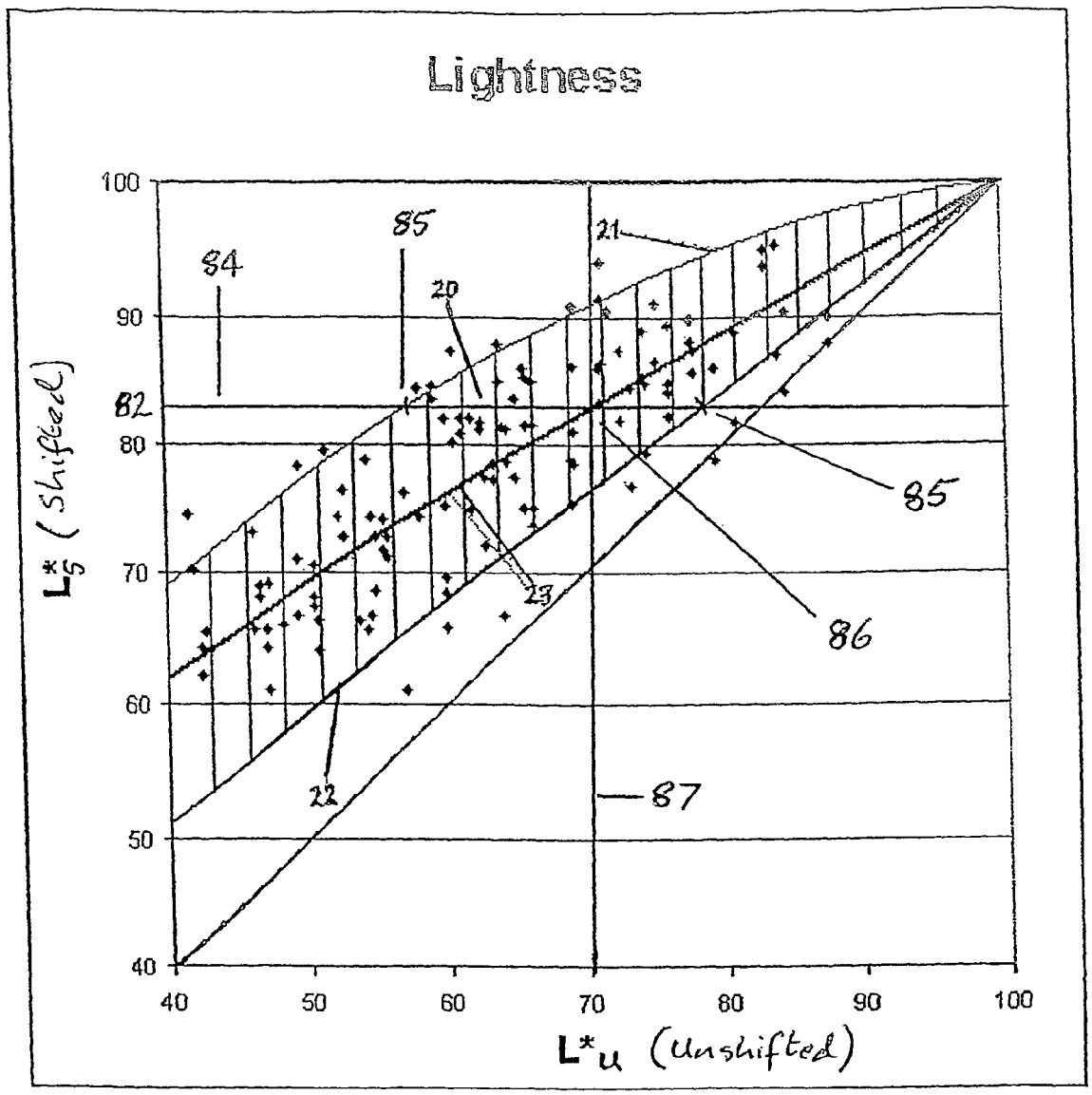
FIG. 8 shows an earlier version of FIG. 2 in which the plots were obtained using only ten colours and lightness values above 40.
Figure 10:
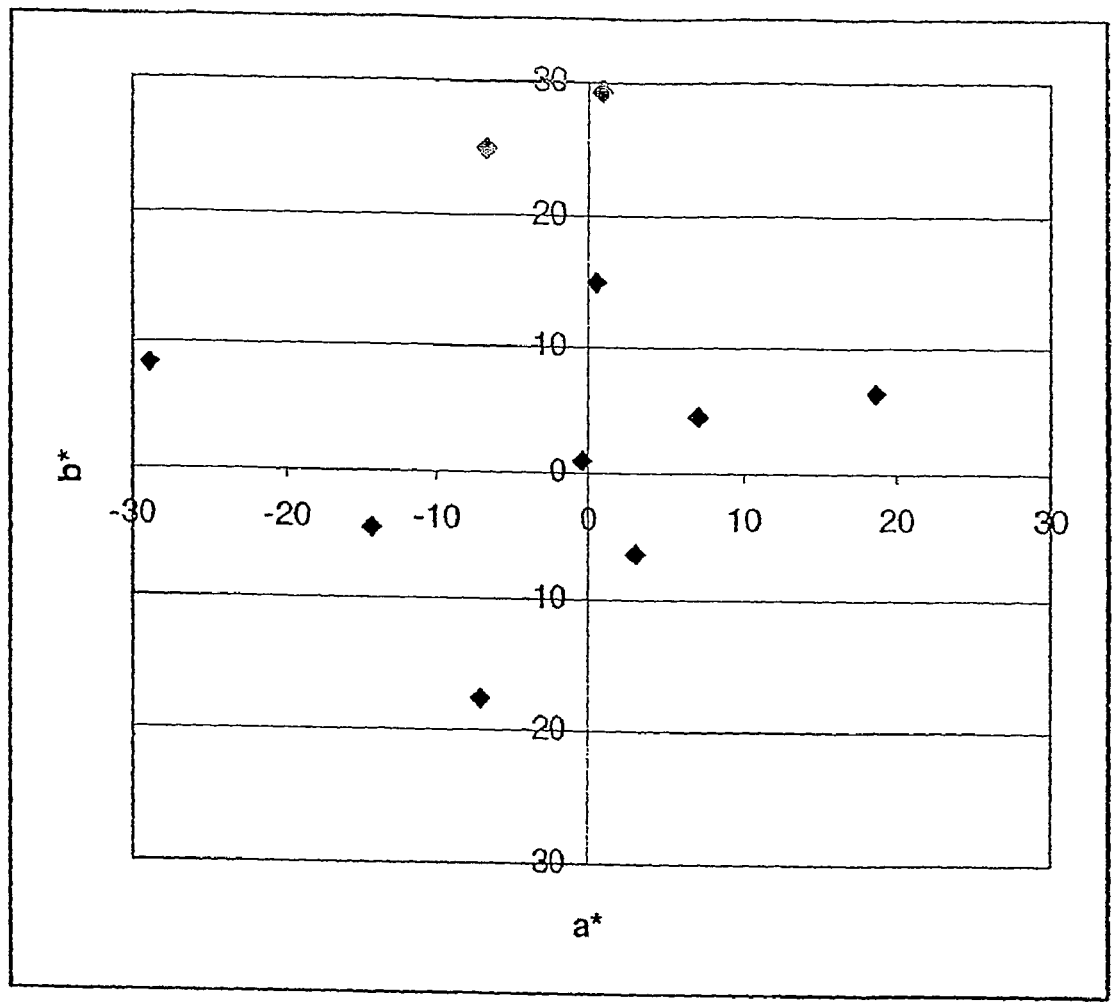
FIG. 10 shows plots on a CIE a*b* diagram of the a* and b* values of the ten colours used to map the areas in FIGS. 8 and 9.
Figure 11:
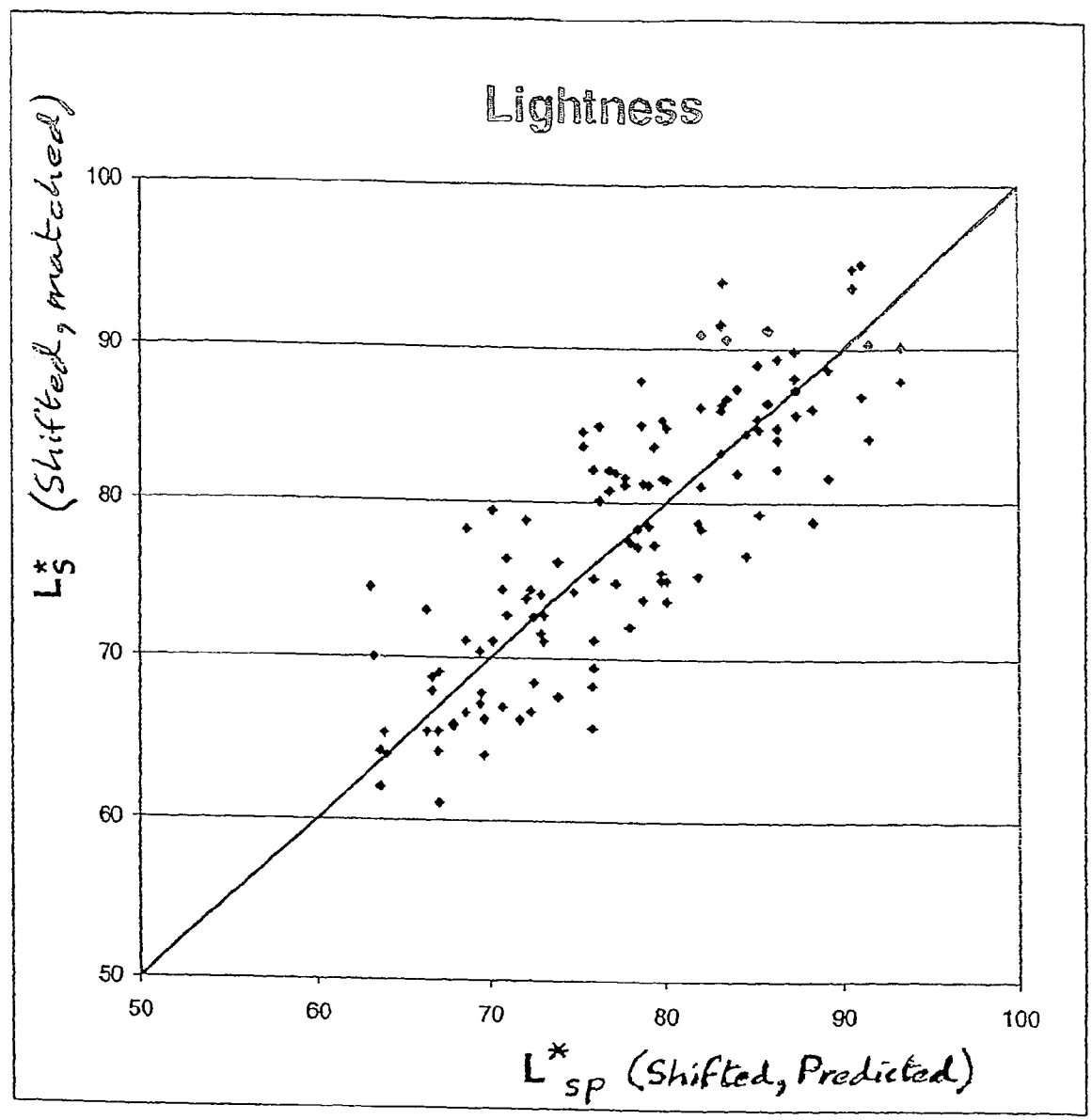
FIG. 11 shows plots of shifted lightness values, $L_s^*$, against predicted shifted lightness values, $L_{sp}^*$.

FIG. 8 shows an earlier version of FIG. 2 which was obtained in exactly the same way as was FIG. 2 except that only the ten colours specified in FIG. 10 were used and all had a lightness values above 40. The curves obtained were less precise but FIG. 11 shows a good agreement between predicted and measured shifted lightness values.

Figure 9:
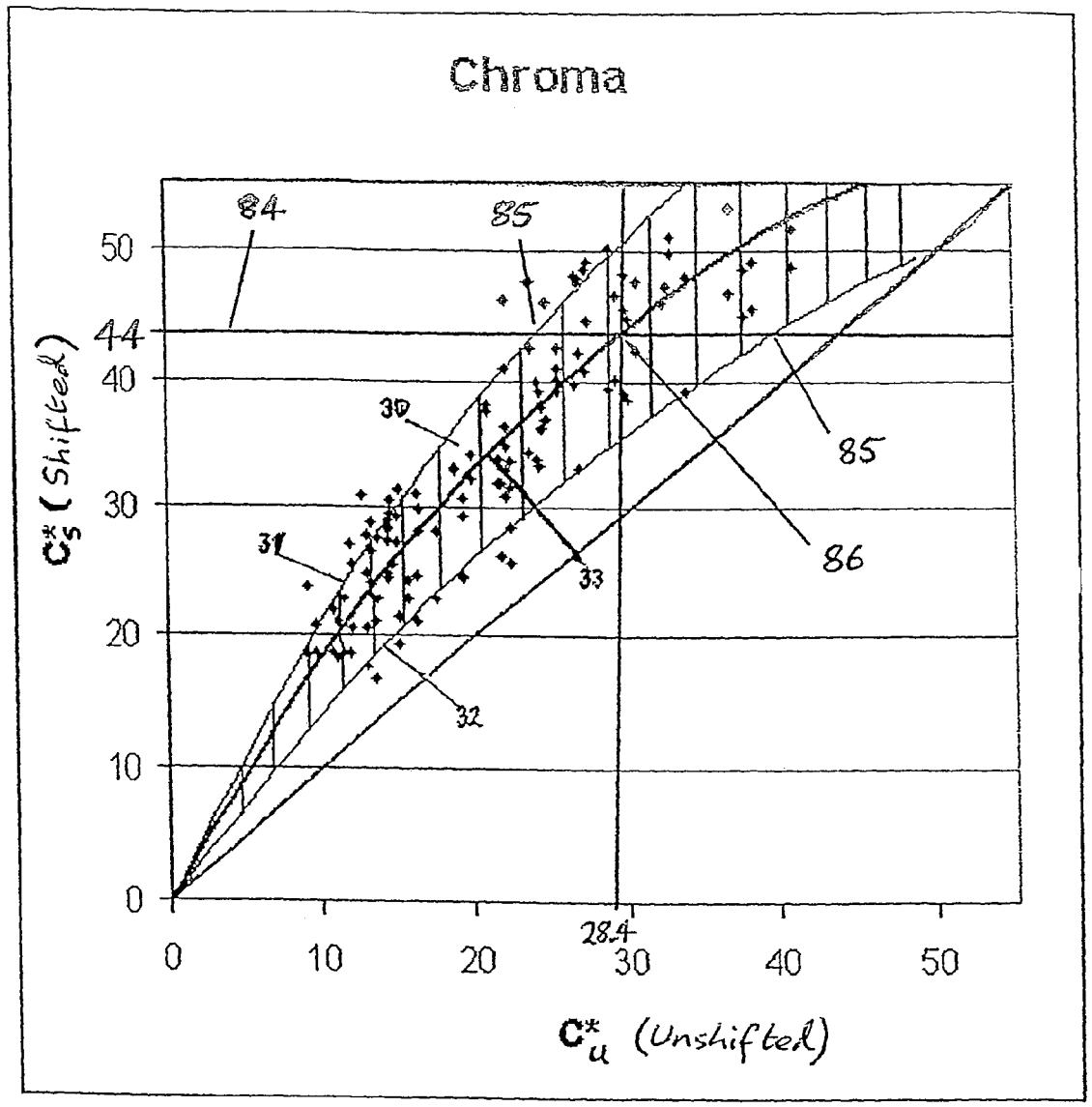
FIG. 9 shows an earlier version of FIG. 3 in which the plots were obtained using only ten colours and chroma values above 40.
Figure 12:
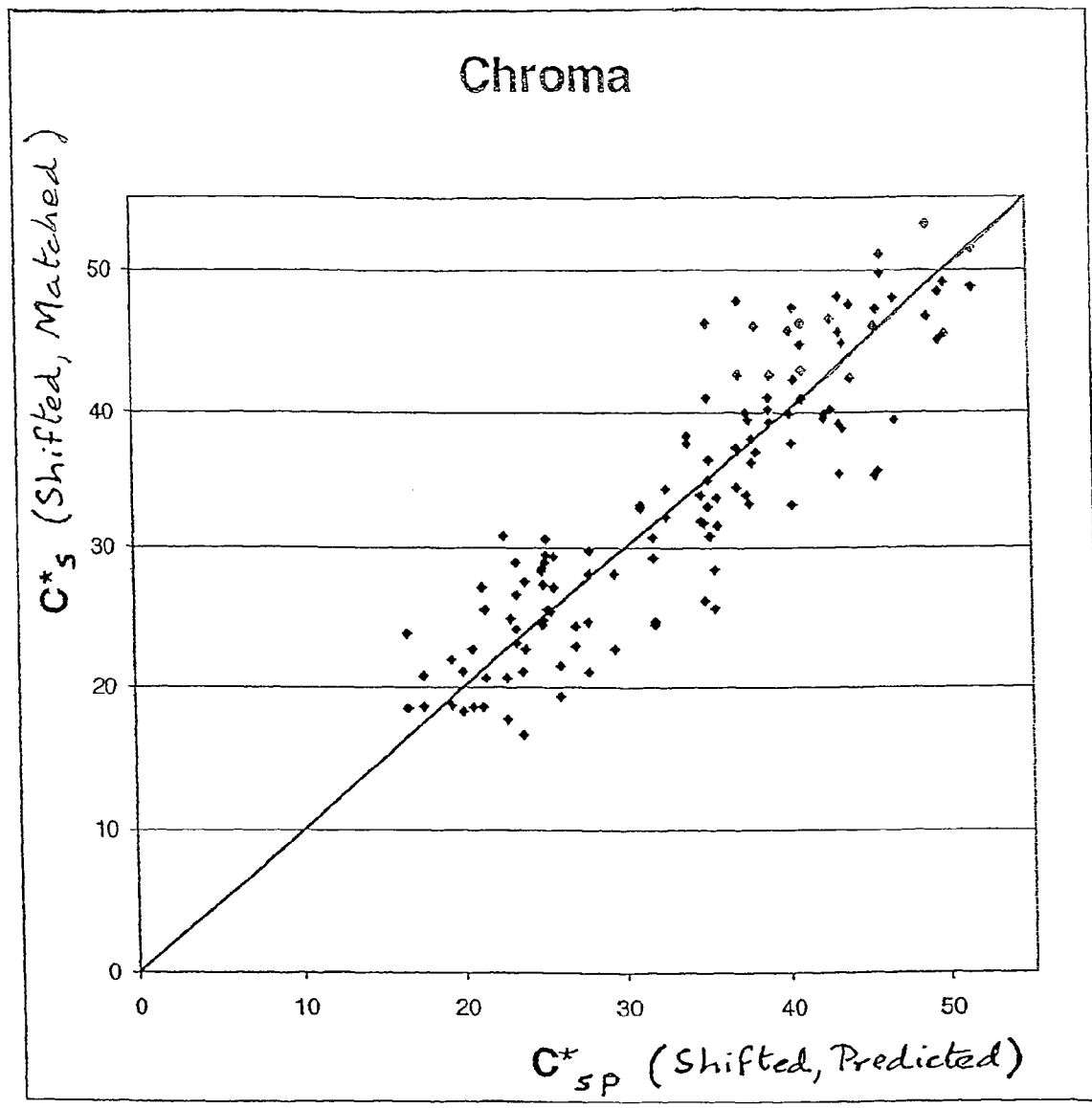
FIG. 12 shows plots of shifted chroma values, $C_s^*$, against predicted shifted chroma values, $C_{sp}^*$.

FIG. 9 likewise shows an earlier version of FIG. 3 which was obtained in exactly the same way as was FIG. 3 except that only the ten colours specified in FIG. 10 were used and all had a chroma values above 10. Curves obtained instead of lines but FIG. 12 still shows a good agreement between predicted and measured shifted lightness values. The curves mat the equation:

$$C_s^* = \alpha_C C_u^{*2} + \beta_C C_u^*$$

where $\alpha_C$ is from 0.01 to 0.03, preferably 0.0175 and $\beta_C$ is from 2 to 2.3 and preferably 2.0.

The invention claimed is:

1. A method for illustrating to choosers of colour by compensating for shifts in human perception of colour which occur when a colour initially perceived as a small colour sample is then perceived extending over a large surface area wherein the method comprises the steps of:
   a) providing an illustration means which allows the colours to be incorporated into a computer-manipulatable digital image of a room so that a true colour can be displayed and the image can be manipulated to display the appropriate shifted colour, wherein the illustration means includes carrier means and a plurality of pairs of colours carried by the carrier means and where each pair comprises a first colour present on the carrier means as a small colour sample and a second colour present on the carrier means as a small colour sample which second colour sample is adjacent the first colour sample,
   b) obtaining the true CIELAB lightness value $L_u$* and the CIELAB chroma value $C_u$* of the colour of the first small colour sample,
   c) choosing a second colour of hue similar to the hue of the first small colour sample which second colour has CIELAB lightness and chroma values $L_s$* and $C_s$* where $$L_u^* = \frac{-\beta_L + \{\beta_L^2 + 4\beta_L[100(1-100\alpha_L-\beta_L)-L_s^*]\}^{1/2}}{2\alpha_L}$$

and $$C_{ut}^* = \frac{-\beta_C + \{\beta_c^2 + 4\alpha_C C_s^*\}^{1/2}}{2\alpha_C}$$

in which
$\alpha_L$ is from −0.007 to −0.0001
$\beta_L$ is from 0.8 to 1.5
$\alpha_C$ is from −0.01 to −0.03
$\beta_c$ is from 2 to 2.3 d) imparting the second colour to the large surface area whereby because of the shift in human perception, the second colour when imparted to the large surface area is perceived by the human mind as being acceptably similar to the colour of the small colour sample wherein the above steps are implemented using the computer.

2. A method according to claim 1 wherein
$\alpha_L$ is from −0.0013 to −0.0001
$\beta_L$ is from 0.75 to 0.95 and
$\alpha_C$ is from 1.05 to 1.9.

3. A method for illustrating to choosers of colour by predicting shifts in human perception of colour which occur when a colour initially perceived as a small colour sample is then perceived extending over a large surface area wherein the method includes a) providing an illustration means which allows the colours to be incorporated into a computer-manipulatable digital image of a room so that a true colour can be displayed and the image can be manipulated to display the appropriate shifted colour, wherein the illustration means includes carrier means and a plurality of pairs of colours carried by the carrier means and where each pair comprises a first colour present on the carrier means as a small colour sample and a second colour present on the carrier means as a small colour sample which second colour sample is adjacent the first colour sample, b) obtaining the CIELAB lightness value $L_u^*$ and the CIELAB chroma value $C_u^*$ of the colour of the first small colour sample, c) increasing the CIELAB lightness and chroma values $L_u^*$ and $C_u^*$ to values $L_s^*$ and $C_s^*$ where $L_s^* = \alpha_L L_u^{*2} + \beta_L L_u^* + 100(1-100\alpha_L-\beta_L)$ and $C_s^* = \alpha_C C_u^{*2} + \beta_c C_u^*$ and $\alpha_L$ is from −0.007 to −0.0001
$\beta_L$ is from 0.8 to 1.5
$\alpha_C$ is from −0.01 to −0.03
$\beta_c$ is from 2 to 2.3 whereby because of the shift in human perception, the values $L_s^*$ and $C_s^*$ predict the lightness and chroma which the colour will be perceived to have when it extends over large surface area wherein the above steps are implemented using the computer.

4. A method of claim 3 for illustrating how the colour of a small colour sample will be perceived by the human mind when the colour extends over a large surface area wherein the method includes a) using the method according to predict the shifted lightness and chroma values, $L_s^*$ and $C_s^*$, for the small colour sample, b) choosing a second colour of hue similar to the hue of the small sample colour which second colour has the lightness and chroma values, $L_s^*$ and $C_s^*$ and c) imparting a small area of the second colour to carrier means whereby the combination of the carrier means and imparted second colour provide an illustration of how the colour of a small colour sample will be perceived by the human mind when the colour extends over a large surface area.

5. An apparatus for illustrating to choosers of colour how their perception of a colour presented as a small sample of colour will shift when the colour is imparted to a large surface area including an illustration means, wherein the illustration means comprises a) carrier means, b) a plurality of pairs of colours carried by the carrier means and where each pair comprises a first colour present on the carrier means as a small colour sample and a second colour present on the carrier means as a small colour, sample which second colour sample is adjacent the first colour sample and wherein i) the first and second colours in a pair have a similar hue, ii) the first small colour sample has a CIELAB lightness value of $L_u^*$ and a CIELAB chroma value of $C_u^*$, iii) the second small colour sample has a CIELAB lightness value of $L_s^*$ and a CIELAB chroma value of $C_s^*$ wherein $L_s^*$ and $C_s^*$ are given by the equations:

$L_s^* = \alpha_L L_u^{*2} + \beta_L L_u^* + 100(1-100\alpha_L-\beta_L)$ and $C_s^* = \alpha_C C_u^{*2} + \beta_c C_u^*$ where
$\alpha_L$ is from −0.007 to −0.0001
$\beta_L$ is from 0.8 to 1,
$\alpha_C$ is from −0.01 to −0.03
$\beta_C$ is from 2 to 2.3, whereby the second colour illustrates the colour to which the first colour will be perceived to have shifted when the first colour has been imparted to a large area.

6. The apparatus of claim 5 wherein $C_s^*$ is given by the equation $C_s^* = \alpha_C C_u$
where $\alpha_C$ is from 1.05 to 2.3.

7. An apparatus for illustrating to choosers of colour how their perception of a colour imparted to a large surface area will shift when the colour is presented as a small sample of colour, including an illustration means, wherein the illustration means comprises a) carrier means, b) a plurality of pairs of colours carried by the earner means and where each pair comprises a first colour present on the carrier means as a small colour sample and a second colour present on the carrier means as a small colour sample which second colour sample is adjacent the first colour sample and wherein i) the first and second colours in a pair have a similar hue, ii) the second colour in the pair has a CIELAB lightness value of $L_s^*$ and a CIELAB chroma value of $C_s^*$ which have both been determined for the second colour when it has been imparted to a large surface area, iii) the first colour in the pair has a CIELAB lightness value of $L_u^*$ and a CIELAB chroma value of $C_u^*$ which have both been determined on a small sample of the colour and where $L_u^*$ and $C_u^*$ are given by the equations $$L_u^* = \frac{-\beta_L + \{\beta_L^2 + 4\alpha_L[100(1-100\alpha_L-\beta_L)-L_s^*]\}^{1/2}}{2\alpha_L}$$

and $$C_u^* = \frac{-\beta_C + \{\beta_C^2 + 4\beta_C C_s^*\}^{1/2}}{2\alpha_C}$$

where $\alpha_L$ is from −0.007 to −0.0001
$\beta_L$ is from 0.8 to 1.5
$\alpha_C$ is from −0.01 to −0.03
$\beta_C$ is from 2 to 2.3 whereby the colour of the first small sample simulates the colour which the second small sample will be perceived to have when the second colour is presented as a small sample.

8. The apparatus of claim 7 wherein $C_u^*$ is given by the equation $C_u^* = C_s^*(\alpha_C)^{-1}$ where $\alpha_C$ is from 1.05 to 2.3.

9. The apparatus of claim 7 wherein the carrier means is the paper or card, on which samples of colours are printed.

10. The apparatus of claim 7 wherein the carrier comprises electronic means.

11. The apparatus of claim 7 wherein the colours are displayed in an electronic schematic diagram of a room.

12. The apparatus of claim 7 wherein each sample colour is on a can filled with coloured material which can is a component of a collection which serves as the carrier means.

13. The apparatus of claim 7 wherein each can comprises a transparent or translucent portion through which the colour of the coloured material is visible.

14. The apparatus of claim 7 wherein the coloured material is a coating composition.

* * * * *